Aug. 1, 1933.  W. N. GOODWIN, JR  1,920,906

TUBE TESTER

Filed Oct. 31, 1930

Inventor:
William Nelson Goodwin, Jr.,
By Byrnes, Townsend & Potter,
Attorneys.

Patented Aug. 1, 1933

1,920,906

UNITED STATES PATENT OFFICE 1,920,906

TUBE TESTER

William Nelson Goodwin, Jr., Newark, N. J., assignor to Weston Electrical Instrument Corporation, Newark, N. J., a Corporation of New Jersey Application October 31, 1930. Serial No. 492,560

7 Claims. (Cl. 250—27)

This invention relates to tube testers and more particularly to a method of and apparatus for determining the mutual conductance of a thermionic tube.

Many forms of tube testers have been developed, but the principles upon which they operate make them comparatively expensive to construct, and their lack of sensitivity in general makes it difficult, if not impracticable, to use them to test tubes having a high amplification factor, and especially those of the screen grid type.

In accordance with the present invention, a direct measurement of the mutual conductance may be obtained with a sensitive measuring instrument of comparatively inexpensive construction and with materially lessened danger of damage from defective tubes, by effecting a more or less complete separation of the plate current into its alternating and direct current components, and measuring the alternating current component only. By applying to the grid of the tube an alternating current voltage of fixed magnitude the measuring instrument may be calibrated directly in micromhos, thus permitting a direct reading of the mutual conductance.

Objects of the invention are to provide a method of and apparatus for obtaining a direct measurement of the mutual conductance of a thermionic tube. A further object is to provide a method of testing tubes wherein a predetermined alternating current voltage is impressed upon the input circuit of the tube, the alternating plate current resulting therefrom or a definite portion of it is separated from the direct current component, and the alternating current response is measured to afford a direct indication of the mutual conductance. Other objects are to provide circuit arrangements and apparatus for carrying out the novel method.

These and other objects of the invention will be apparent from the following specification when taken with the accompanying drawing in which.

Figure 1:
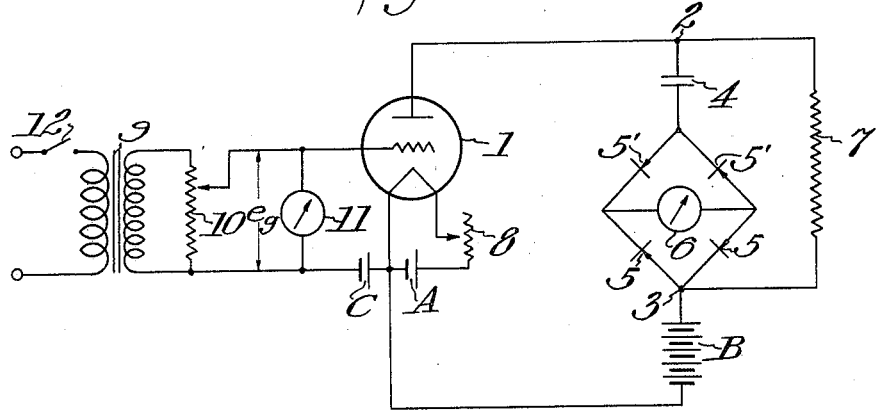
Fig. 1 is a circuit diagram illustrating one embodiment of the invention.

As shown diagrammatically in Fig. 1, there is included in the plate circuit of the tube 1, between the points 2 and 3, two parallel paths for properly separating the alternating and direct components of the plate current. One of these paths includes a condenser 4 and an alternating current measuring instrument of the type described in my prior patent, No. 1,746,935, i. e., a rectifier bridge having as the side arms asymmetric crystals 5 which rectify the current passed to the sensitive direct current measuring instrument 6. This circuit can carry alternating current only as the condenser 4 blocks any direct current. The other path includes a resistor or reactor 7 of such magnitude that the impedance presented to the alternating component of the plate current will exclude a predetermined part or all of the alternating component from this path. This circuit carries all of the direct current component and a definite portion of the alternating current component.

When this shunt element 7 is a reactor, and especially when it takes the form of an inductance having an iron core, the shunt path will have a low resistance for direct current while the impedance for alternating components may be made so high that substantially the entire alternating current flows through the measuring instrument path, thus increasing the sensitivity of the combination. On the other hand, if the direct current passing through the reactor is sufficiently large as to vary the reactance of the reactor, by the well known effect of changing the magnetic conditions in the iron core and thus change the effective value of the impedance of the shunt path, it is preferable to use a non-inductive resistor.

The usual plate battery B, heater or cathode battery A and grid bias battery C are provided, the flow of current to the heater or filament being controlled and regulated by suitable means, such as a combined switch and rheostat 8. These A, B and C voltages may of course be supplied by rectified and filtered alternating current from battery eliminators.

The alternating voltage for application to the grid circuit of the tube may be obtained from the usual 60 cycle house lighting circuit by means of a step-down transformer 9, the secondary of the transformer being shunted by a voltage divider or potentiometer 10. One terminal of the potentiometer is connected to the cathode through the bias battery C, the adjustable tap of the potentiometer going to the grid terminal of the tube. An alternating current voltmeter 11 is connected across the grid circuit and a switch 12 is preferably included in the primary circuit of the transformer.

When the input alternating voltage $e_g$ is zero, the current in the plate is the normal direct current plate current which passes through the resistor 7 but does not flow through the measuring instrument due to the blocking condenser 4. When, however $e_g$ has some value other than zero, the amplifying property of the tube results in an alternating current $i_p$ in the plate current, which alternating component divides between the shunt resistor 7 and the measuring circuit in accordance with the relative impedances of these parallel paths. That portion of the plate circuit between points 2 and 3 therefore constitutes an alternating current measuring instrument and the reading of current flow through the instrument 6 is proportional to the entire alternating current component which results from the alternating voltage applied to the grid.

The well known relation between this current $i_p$ and the grid input voltage is:

$$i_p = e_g g_m,$$

where $g_m$ is the mutual conductance, or $$g_m = \frac{i_p}{e_g}$$

If, therefore, the input voltage is maintained constant, the instrument may be calibrated directly in terms of mutual conductance. For example, if potentiometer 10 is always adjusted to give an $e_g$, as indicated by voltmeter 11, of 1 volt and it requires 0.0015 ampere through circuit 2—3 to produce full scale deflection on the instrument 6, then the instrument can be calibrated from 0 to 1500 micromhos; that is $$g_m = \frac{0.0015}{1} \times 1{,}000{,}000 = 1500$$

It is to be noted that the instrument indicates the mutual conductance of the entire plate circuit, including the impedance of the instrument circuit. In many instances, for example with screen grid tubes which have a very high plate impedance, the error involved in taking the mutual conductance of the entire plate circuit as the mutual conductance of the tube will be very small. If greater accuracy is desired, the scale of instrument 6 may be calibrated in terms of the mutual conductance of the tube by allowing for the instrument resistances during calibration or by the use of correction curves.

One great advantage of this rectifier type of apparatus over previous constructions is found in its high sensitivity. In devices employing alternating current instruments of the usual types the current required for full scale deflection is much more than 1.5 milliamperes, and all readings must be taken near zero, which is in the congested portion of the scale, or the input voltage must be excessive, a condition which is usually prohibitive.

In one practical embodiment of an instrument having a full scale reading of 1500 micromhos corresponding to 1.5 milliamperes, for an input voltage of 1 volt alternating current at 60 cycles, the resistor 7 had a value of approximately 400 ohms and the condenser 4 had a capacity of about 4 microfarads. With these circuit constants, approximately 75% of the total alternating current passed through the direct current path. If desired, even greater sensitivity may be had by increasing the impedance of the direct current path.

As compared with those types of circuits or apparatus which employ the ordinary type of alternating current measuring instruments, the present invention provides apparatus having a great overload capacity, and eliminates the danger of damage to the indicating instrument in the event that a short-circuited tube is tested, as it is protected from the direct current voltage by the condenser 4.

Figure 2:
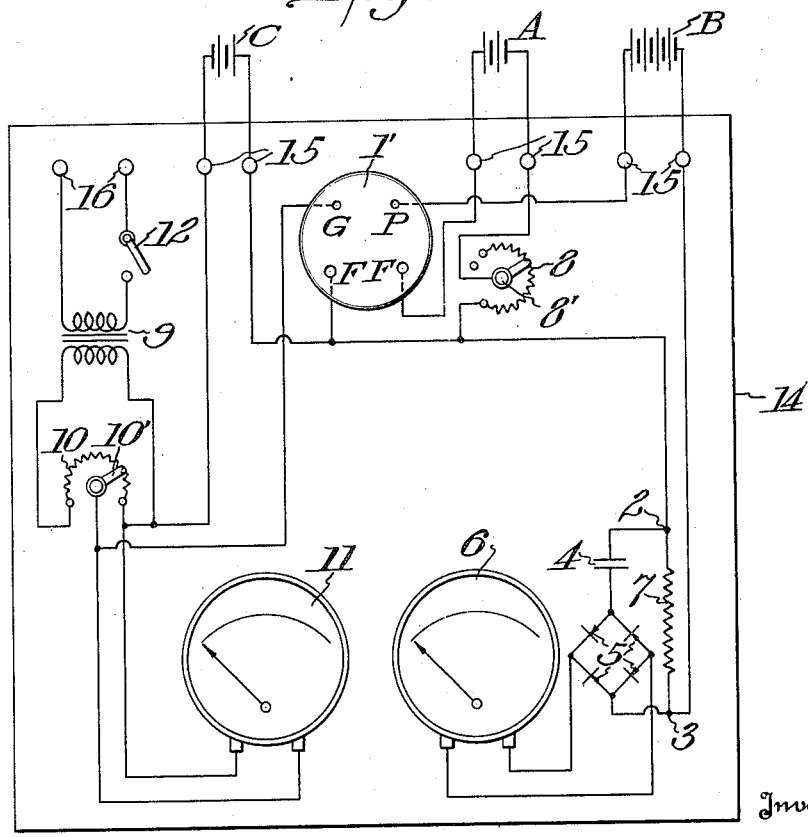
Fig. 2 is a schematic view in which cetrain of the circuit elements are shown, in plan, as they appear upon the panel of a commercial embodiment of the invention.

As shown in Fig. 2, the apparatus may be conveniently incorporated in a small instrument box having terminals for receiving connections from the several batteries or other direct current sources and the house lighting circuit. In this view, the electrical circuits are identical with those shown in Fig. 1, but the meters and control devices are shown in elevation and in the relative positions which they occupy when mounted upon a panel, the latter being indicated by the rectangle 14 which encloses all of the apparatus except the several batteries. A socket 1' is mounted on the panel for receiving the tube to be tested, control knobs 8' and 10' on the panel permit adjustment of the filament or heater, rheostat 8 and the voltage divider 10, respectively, and a series of terminals 15 are provided for establishing the circuit connections to the A, B and C voltages. Terminals 16 are provided for connection to the house lighting circuit or, if desired, the apparatus may be provided with the usual form of flexible extension cord and detachable plug connector. As the other elements shown in Fig. 2 are identical with the corresponding elements of Fig. 1, a detailed explanation of this schematic view is believed to be unnecessary.

I claim:

1. In the process of determining the mutual conductance of a vacuum tube, the method which comprises impressing a predetermined alternating current voltage upon the grid circuit of said tube, rectifying the alternating component resulting in the plate circuit from said impressed voltage, and measuring the rectified current.

2. In apparatus for determining the mutual conductance of a vacuum tube, the combination of means for impressing an alternating voltage of predetermined magnitude upon the grid circuit thereof, circuit elements providing alternating current and direct current paths in parallel in the plate circuit of said tube, said circuit elements including means for rectifying the alternating current flowing in said alternating current path, and means for measuring the rectified current.

3. In apparatus for measuring the mutual conductance of a vacuum tube, the combination with circuit elements and sources of potential for energizing the tube, of a voltmeter for measuring the voltage of an alternating current impressed upon the input terminals of the tube, a circuit element having a substantial alternating current impedance connected in series with the tube plate and the source of plate current supply, and a circuit shunted across said element, said circuit including a Wheatstone bridge arrangement of crystal rectifiers and a direct current measuring instrument connected across opposite junctions of said bridge, the other pair of junctions serving as terminals for connecting said bridge in said circuit.

4. In apparatus for measuring the mutual conductance of a vacuum tube, the combination with means for applying energizing potentials to the tube, and means for impressing an alternating current voltage across the input terminals of said tube, of means for adjusting the said impressed alternating voltage to a predetermined value, an element in a portion of the plate circuit of said tube which is traversed by direct current, said element presenting a substantial impedance to the flow of alternating current, and an alternating current path shunted across said element, said path including a condenser for blocking the flow of direct current, means for rectifying alternating current traversing said alternating current path, and means for measuring the rectified current.

5. In apparatus for measuring the mutual conductance of vacuum tubes, a socket for receiving a vacuum tube, terminals for receiving connections from sources of potential appropriate for the energization of the electrode circuits of a tube placed in said socket, circuit elements connecting said terminals with the tube socket terminals; said circuit elements including an alternating current impedance in the direct current plate circuit of the tube, a condenser and a rectifier bridge of four crystals in series with each other and shunted across said impedance, and a direct current measuring instrument connected across said bridge at terminals conjugate to those bridge terminals by which said bridge is connected in series with said condenser.

6. In apparatus for measuring the mutual conductance of a vacuum tube, a tube socket, an input circuit connected across the input terminals of said socket and including a voltage divider for adjusting the input voltage, an alternating current voltmeter for measuring the voltage established across the input terminals of said socket, and a measuring circuit included in the plate circuit connections to said socket; said measuring circuit including a blocking condenser in series with a Wheatstone bridge having rectifier crystals in the four side arms thereof, an element shunted across said condenser and bridge, said element providing a path for direct current flow and having a substantial impedance for alternating current, and a direct current measuring instrument connected between those bridge junctions which are conjugate to the bridge junctions by which said bridge is connected in series with said condenser.

7. The invention as set forth in claim 6, wherein the impedance of said element is so related to the impedance of the series condenser-bridge circuit that a substantial part of the alternating plate current flows through said element.

WILLIAM NELSON GOODWIN, Jr.

DISCLAIMER 1,920,906.—*William Nelson Goodwin, Jr.*, Newark, N. J. Tube Tester. Patent dated August 1, 1933. Disclaimer filed July 10, 1936, by the assignee, *Weston Electrical Instrument Corporation.*

Hereby enters this disclaimer of claim 1 of said patent.

[*Official Gazette August 18, 1936.*]